United States Patent [19]
Kubota

[11] Patent Number: 4,586,858
[45] Date of Patent: May 6, 1986

[54] ROTARY CUTTING TOOL

[76] Inventor: Masao Kubota, 2-22-7, Narimasu, Itabashi-ku, Tokyo, Japan

[21] Appl. No.: 635,501

[22] Filed: Jul. 30, 1984

[30] Foreign Application Priority Data

Aug. 2, 1983 [JP] Japan .................................. 58-140489

[51] Int. Cl.$^4$ .............................................. B23B 51/00
[52] U.S. Cl. ..................... 408/224; 408/211
[58] Field of Search ............... 408/199, 224, 227, 228, 408/226, 211

[56] References Cited

U.S. PATENT DOCUMENTS

| | | | |
|---|---|---|---|
| 3,726,352 | 4/1973 | Roos | 408/224 |
| 4,108,567 | 8/1978 | Faber | 408/226 |
| 4,149,821 | 4/1979 | Faber | 408/226 |
| 4,194,862 | 3/1980 | Zweekly | 408/211 |
| 4,367,991 | 1/1983 | Grafe | 408/224 |
| 4,411,563 | 10/1983 | Moon | 408/224 X |

FOREIGN PATENT DOCUMENTS

| | | | |
|---|---|---|---|
| 751130 | 1/1967 | Canada | 408/211 |
| 550306 | 1/1942 | United Kingdom | 408/211 |

Primary Examiner—Jimmy C. Peters
Attorney, Agent, or Firm—Merchant, Gould, Smith, Edell, Welter & Schmidt

[57] ABSTRACT

A rotary cutting tool having at an axial end surface thereof two cutting edge lines arranged substantially in a diametral plane extending through a center of rotation of the tool, one cutting edge line having an inner cutting edge section adjacent to the center and the other having an inner noncutting edge section adjacent to the center. Each of the cutting edge lines has at least one intermediate noncutting edge section. The at least one intermediate noncutting edge section of the cutting edge line having the inner cutting edge section is located within a radial range far from the center larger than a radius from the center of the inner noncutting edge section of the other cutting edge line. The total length of the at least one intermediate noncutting edge section of the cutting edge line having the inner cutting edge section is greater than a length of the inner noncutting edge section of the other cutting edge line. The intermediate noncutting edge section of the cutting edge line having the inner noncutting edge section is located within a radius from the center smaller than a radius from the center of an outermost cutting edge section of the cutting edge line having the inner cutting edge section. The length of the intermediate noncutting edge section of the cutting edge line having the inner noncutting edge section is smaller than the total length of the intermediate noncutting edge section of the cutting edge line having the inner cutting edge section.

2 Claims, 13 Drawing Figures

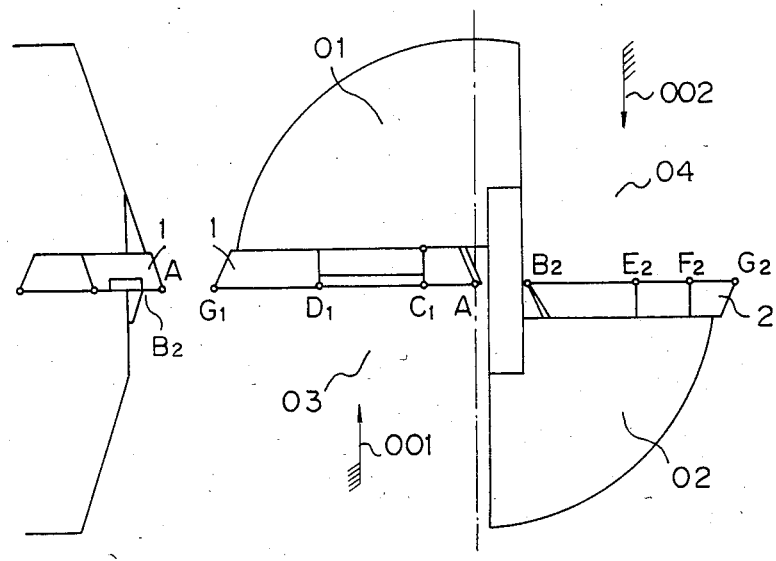
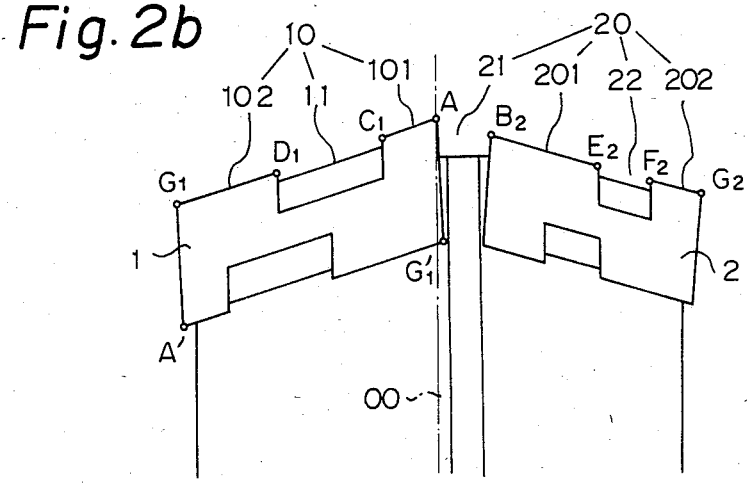

ROTARY CUTTING TOOL

BACKGROUND OF THE INVENTION (1) Field of the Invention

The present invention relates to a rotary cutting tool for use in drilling and end milling workpieces, more particularly to a rotary cutting tool with an efficient cutting edge at the center of rotation of the facing end thereof and with substantially balanced bending moments around the tool axis.

(2) Description of the Prior Art

In conventional drills, there is a problem of poor cutting quality at the chisel edge of the drill point. Due to this, an excessive axial thrust pressure is required for machining work. Various proposals have been made up until now to overcome this problem.

One such proposal has been for provision of a cemented carbide-tipped drill with a straight cutting edge extending from the center of the drill point to or close to the periphery on one side and a straight cutting edge extending from a noncutting edge in the central area to or close to the periphery on the diametrically opposite side.

In such a drill, however, only part of the bending moments occurring around the drill axis due to cutting resistance along the two cutting edge lines can be counterbalanced. As a result, there is a tendency to flexure of the drill. This creates problems as to accuracy of the size and straightness of the drilled holes, which is particularly disadvantageous when drilling deep holes.

SUMMARY OF THE INVENTION

The present invention has as its principal object the substantial neutralization of bending moments caused from cutting resistance. The gist of the invention resides in the formation of an intermediate noncutting edge section of a predetermined length and location in both the cutting edge lines. The length and location of the noncutting edge sections are determined by various parameters through theoretical calculus. When confirmation and correction of the values obtained are made by tests, further improved precision can be obtained.

BRIEF DESCRIPTION OF THE DRAWINGS

The present invention will be better understood from the ensuing description of the preferred embodiments, made in reference to the accompanying drawings, wherein:

FIG. 2a and FIG. 2b are views similar to FIG. 1a and FIG. 1b and show intermediate noncutting edge sections in the cutting edge lines of different dimensions;

FIG. 2c is a side elevational view illustrating part of the left cutting edge line as viewed from the left of FIG. 2a;

FIG. 6b is a schematic side elevational view in a plane including the two cutting edge lines of the embodiment of FIG. 6a.

FIG. 7b is a schematic side elevational view of the embodiment of FIG. 7a.

DESCRIPTION OF THE PREFERRED EMBODIMENTS

In a rotary cutting tool, when a substantially straight cutting edge line on one side is provided with an inner cutting edge adjacent to the center of rotation at the end of the tool, the cutting edge line on the opposite side should have a noncutting edge section adjacent to the center so as to ensure the strength of the central core portion of the tool body.

With such a structure, however, the cutting resistance along the two cutting edges results in unbalanced bending moments around the axis of the rotating tool. To reduce the unbalance in moments, consideration has been given to the provision of intermediate noncutting edge sections in the cutting edge line on the side with the inner cutting edge. However, it is impossible to sufficiently eliminate the unbalanced bending moment acting on the tool by the formation of intermediate noncutting edge sections on just this side. The inventor has solved the problem by providing another intermediate noncutting edge section in the cutting edge line of the side having the inner noncutting edge section and by appropriately determining the lengths and locations of the intermediate noncutting edge sections on the two cutting edge lines. The inventor has drawn up a theory for this and has confirmed it through experiments.

Figure 1A:
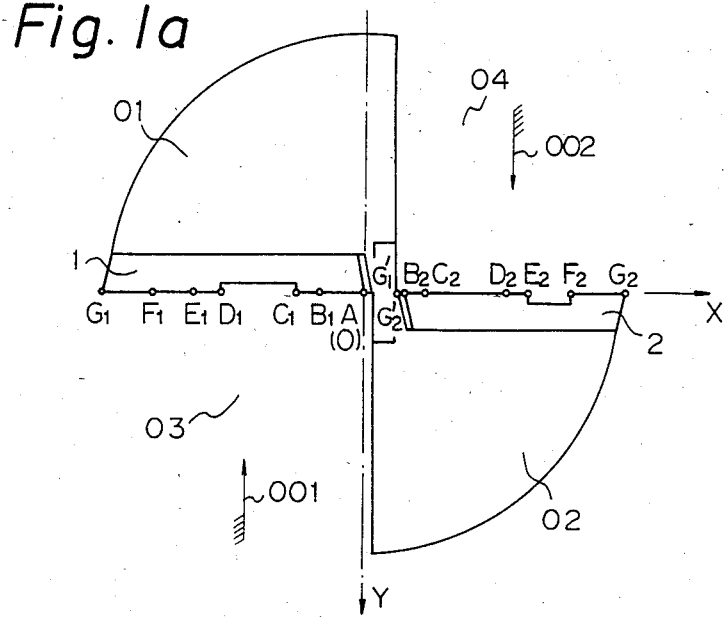
FIG. 1a is a schematic plan view of an end of a drill according to one embodiment of the present invention.
Figure 1B:
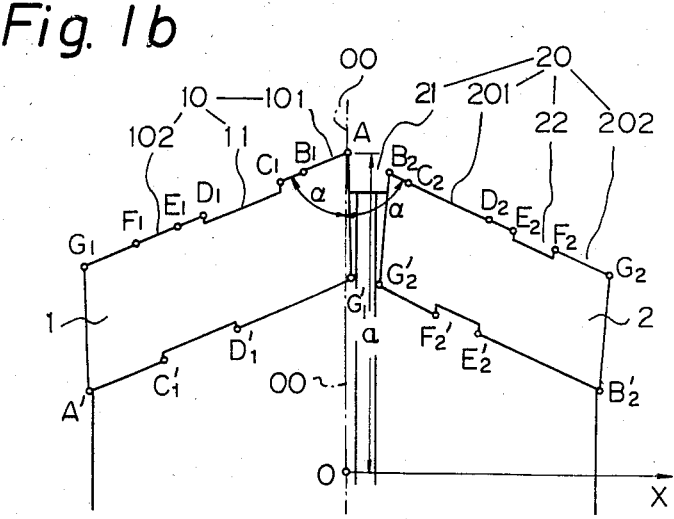
FIG. 1b is a schematic side elevational view taken in a longitudinal plane of the drill of FIG. 1a illustrating the right and left cutting edge lines.

FIGS. 1a and 1b show a drill for drilling workpieces, in which drill the left and right straight cutting edges intersect the axis 00 of the drill at similar angles. In FIG. 1b (and 2b, 3b, 6b, and 7b), the cutting edge line shown on the left is viewed from the direction of arrow 001 and the cutting edge line shown on the right is viewed from the direction of arrow 002 which arrows appear in the corresponding plan views, respectively. In all the figures, incidentally, similar or corresponding parts are designated by the same reference numerals.

The left cutting edge line forms a linear cutting edge extending from a center of rotation A to the periphery $G_1$ and consists of an inner cutting edge section 101 ($AC_1$), an intermediate noncutting edge section 11 ($C_1D_1$), and an outer cutting edge section 102 ($D_1G_1$). The right cutting edge line forms a linear cutting edge line extending from a point $B_2$ to the periphery $G_2$, point $B_2$ being spaced from the center A by an inner noncutting edge section 21 ($AB_2$). Therefore, the right cutting edge line consists of the inner noncutting edge section 21 ($AB_2$), an inner cutting edge section 201 ($B_2E_2$), an intermediate noncutting edge section 22 ($E_2F_2$), and an outer or peripheral edge section 202 ($F_2G_2$). Hereinafter, the left side is referred to as the cutting edge line having the inner cutting edge and the right side as the cutting edge line having the inner noncutting edge.

The indication $B_1$ in the drawing of the inner cutting edge section 101 ($AC_1$) on the left side shows the point equidistant from the center A as the point $B_2$ of the inner noncutting edge section on the right side, i.e., the point $B_1$ has the same radius $r_B$ from the axis 00 as the point $B_2$. The indication $C_2$ in the drawing of the inner cutting edge section 201 ($B_2F_2$) on the right side shows the point equidistant from the center A as the point $C_1$ of the intermediate noncutting edge section 11 ($C_1D_1$) on the left side, i.e., the point $C_2$ has the same radius $r_C$ from the axis 00 as the point $C_1$. Likewise, indication $D_2$ in the drawing of the inner cutting edge section 201 ($B_2E_2$) on the right side shows the point $D_2$ having the same radius $r_D$ from the axis 00 as the point $D_1$ of the intermediate noncutting edge section 11 ($C_1D_1$) on the left side; and indications $E_1$ and $F_1$ in the drawing of the outer cutting edge section 102 ($C_1D_1$) on the left side indicate points having the same radii $r_E$ and $r_F$ from the axis 00 as the points $E_2$ and $F_2$ of the intermediate noncutting edge section 22 ($E_2F_2$) on the right side. Both peripheral points $G_1$ and $G_2$ have the same radius $r_G = AG_1 = AG_2$. The interrelationship between those radii in dimensions is $r_B \leq r_C < r_D \leq r_E < r_F \leq r_G$.

For the purpose of simplification, the rounded off portions at the ends of the cutting edges are treated as sharp. Further, the rake angle and the relief angle are treated as constant at each point in the cutting edge lines. Still further, the specific cutting resistances acting on each point in the cutting edges are treated as constant, regardless of the effects of varying cutting speeds.

Supposing that the main cutting resistance per unit length in the circumferential direction at an arbitrary lengths s along the cutting edge is $f_c$ and the component of the main cutting resistance perpendicular to the cutting edge and lying in a plane including the axis 00 and the linear cutting edge line is $f_n$, then $$f_c/f_n = k$$

where k is a constant.

The left and right cutting edges cut at the same time, therefore, the total cutting resistance may be considered to be $\lambda$ times the cutting resistance in the case of a single cutting edge. In this case, it may be considered that $\lambda \doteq \frac{1}{2}$.

The components of the main cutting resistance acting on an infinitesimal length ds ($=dr/\sin \alpha$) at an any point on the cutting edge can be expressed as below, wherein the symbol r stands for the radius at any point:

Circumferential component $f_c ds = k f_n \cdot dr/\sin\alpha$
Axial component $f_t ds = f_n \sin\alpha \cdot dr/\sin\alpha = f_n dr$
Radial component $f_r ds = f_n \cos\alpha \, dr/\sin\alpha$
$\qquad = f_n \cot\alpha \cdot dr$ As can be seen from FIGS. 1a, 1b, 2a, and 2b, if the bending moment around the horizontal axis OX which passes through an arbitrary point O in the drill axis 00, in which the distance between the point O and the center A is indicated as symbol a, and the bending moment around the horizontal axis OY perpendicular to the above horizontal axis OX respectively are made zero, there is possible to obtain the conditions for eliminating the bending moments acting around the axis of the drill.

First, the conditional equation for the bending moment around the horizontal axis OX can be written as:

$$\int_A^{G_1} (a - r\cot\alpha) f_c ds - \int_A^{G_2} (a - r\cot\alpha) f_c ds = 0$$

When the values $f_c = k \times f_n$ and $ds = dr/\sin\alpha$ are substituted in the above equation, the following is obtained:

$$\int_A^{G_1} \frac{k f_n}{\sin\alpha} (a - \gamma\cot\alpha) dr - \int_A^{G_2} \frac{k f_n}{\sin\alpha} (a - \gamma\cot\alpha) dr = 0 \qquad (1)$$

When equation (1) is integrated assuming $f_n$ is a fixed number, the following is obtained:

$$\left( \frac{k f_n}{\sin\alpha} \left( ar - \frac{r^2}{2} \cot\alpha \right) \right)_A^{G_1} - \left( \frac{k f_n}{\sin\alpha} \left( ar - \frac{r^2}{2} \cot\alpha \right) \right)_A^{G_2} = 0 \qquad (1)'$$

Similarly, the conditional equation for the bending moment around the horizontal axis OY can be written as follows:

$$\left\{ \int_A^{G_1} (a - r\cot\alpha) f_t ds - \int_A^{G_1} r f_r ds \right\} -$$

$$\left\{ \int_A^{G_2} (a - r\cot\alpha) f_t ds - \int_A^{G_2} r f_r ds \right\} = 0$$

When the values of the components $f_r ds = f_n \cot\alpha \cdot dr$ and $f_t ds = f_n dr$ are substituted in the equation, the secondary basic condition is obtained:

$$\int_A^{G_1} f_n \left( a\cot\alpha - \frac{r}{\sin^2\alpha} \right) dr - \qquad (2)$$

$$\int_A^{G_2} f_n \left( a\cot\alpha - \frac{r}{\sin^2\alpha} \right) dr = 0$$

When equation (2) is integrated assuming that $f_n$ is a fixed number, one obtains:

$$\left( f_n \cot\alpha \left( ar - \frac{r^2}{\sin 2\alpha} \right) \right)_A^{G_1} - \left( f_n \cot\alpha \cdot \left( ar - \frac{r^2}{\sin 2\alpha} \right) \right)_A^{G_2} \qquad (2)'$$

The values of $f_n$ in each of the divided domains of integration are as follows:

| Domains | $f_n$ | Domains | $f_n$ |
| --- | --- | --- | --- |
| A–$B_1$ | K (constant) | A–$B_2$ | 0 |
| $B_1$–$C_1$ | $\lambda$K | $A_2$–$C_2$ | $\lambda$K |
| $C_1$–$D_1$ | 0 | $C_2$–$D_2$ | K |
| $D_1$–$E_1$ | $\lambda$K | $D_2$–$E_2$ | $\lambda$K |
| $E_1$–$F_1$ | K | $E_2$–$F_2$ | 0 |
| $F_1$–$G_1$ | $\lambda$K | $F_2$–$G_2$ | $\lambda$K |

In the domain where the component of cutting resistance $f_n$ equals $\lambda$K, the bending moments may be counterbalanced.

From these formulas (1)' and (2)', one can derive the following formulas:

$$a(r_B + r_F - r_E - r_D + r_C) -$$

-continued $$\frac{\cot \alpha}{2} (r_B^2 + r_F^2 - r_E^2 - r_D^2 + r_C^2) = 0,$$

and further $$a(r_B + r_F - r_E - r_D + r_C) - \frac{1}{\sin 2\alpha} (r_B^2 + r_F^2 - r_E^2 - r_D^2 + r_C^2) = 0$$

Independently from the values of a and $\alpha$, the conditions for satisfying the two formulas are given by the following:

$$r_B + r_F + r_C - r_E - r_D = 0 \quad (3)$$

$$r_B^2 + r_F^2 + r_C^2 - r_E^2 - r_D^2 = 0 \quad (4)$$

If one assumes $r_B/R_F = b$, $r_C/r_F = c$, $r_D/r_F = d$, and $r_E/r_F = e$, one can obtain the following formulas:

$$b + c - d - e + 1 = 0 \quad (5)$$

$$b^2 + c^2 - d^2 - e^2 + 1 = 0 \quad (6)$$

The above two equations include four unknown variables. Therefore, by giving two independent conditions to each, it is possible to solve the equations and find the unknown values. For example, if the values of b and e are given, then c and d can be found as below:

$$c = e - b/(1 + b - e)$$
$$d = 1 - b \cdot (e - b)/(1 + b - e) \quad (7)$$

If b equals c and d equals c, points $B_1$ and $C_1$, points $C_1$ and $D_1$, points $B_2$ and $C_2$, and points $D_2$ and $E_2$, respectively, coincide in position. As a result, one can obtain the following:

$$b = c = 0.25$$
$$d = e = 0.75 \quad (8)$$

Namely, then one obtains:

$$r_B = r_C = r_F/4$$

$$r_D = r_E = 3/4 \times r_F$$

where the value of the outermost radius $r_G$ is equal to or larger than that of $r_F$ and may be arbitrarily determined. The cutting edges arranged at the outermost sections $F_1G_1$ and $F_2G_2$ are provided for use in finishing for drilling work. FIGS. 2a and 2b illustrate cutting edge lines made under the condition $r_G = 5/4 \times r_F$.

Now, if $AC_1 = D_1F_1$ and $B_1C_1 = D_1E_1$, namely, $c = 1 - d$ and $c - b = e - d$, one can derive the equation $b + e = 1$ from the previous basic equation (5). By substituting the condition $b + e = 1$ into basic equation (6), one can obtain the important relationship $e - b = 2c$ or $B_2E_2 = 2AC_1$.

This means that it is possible to make a drill of different diameter by keeping the length $AC_1$ constant and appropriately varying the length of the noncutting edge section $C_1D_1$. Note that the above-stated relations are valid regardless of the apex angle $2\alpha$ of the cone at the drill end. As a result, the outer diameter of the drill may be changed within a wide range by leaving the length of $AC_1$ the same, using these relations, and changing the apex angle.

As it is the sections $AF_1$ and $B_2F_2$ which are indispensable for neutralizing the unbalanced bending moments, the outermost cutting edge sections $F_1G_1$ and $F_2G_2$ may be of any length and of any apex angle $2\alpha$ so long as these sections $F_1G_1$ and $F_2G_2$ have precisely the same configuration and are symmetric with respect to the axis 00. Therefore, one can design a new drill having a radius $r_G$ larger than $r_F$, holding the portions $AF_1$ and $AF_2$ in common.

Figure 3A:
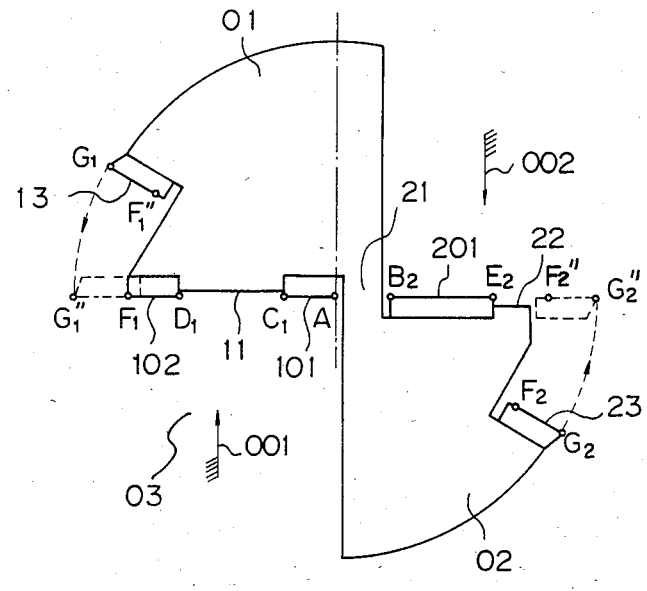
FIG. 3a and FIG. 3b are views of a drill with an adjustable outer diameter.
Figure 3B:
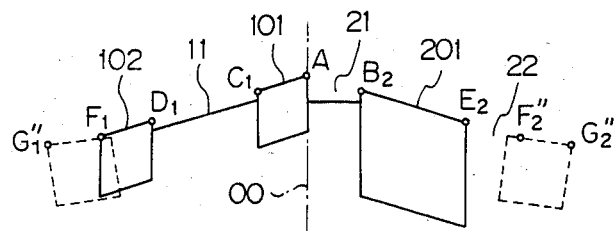

FIGS. 3a and 3b show an example of this. In the figures, the sections $F_1G_1$ and $F_2G_2$ comprise additional or replaceable peripheral cutting blades 13 and 23, respectively. The outer diameter of the drill can be changed by adjusting the outward radial position of the blades 12 and 23. In this case, the cutting speed of the additional or replaceable blades 13 and 23 is greater than that of any other section of the original cutting edge lines, the thickness of the generated chips is approximately halved. This is advantageous for tool life.

The drill according to the present invention may be composed of inserted carbide-alloy tipped-blades. If the rake angle of the tipped blades is designated, however, there are limitations to the apex angle $2\alpha$ of the imaginary cone surface at the drill end in view of interference between the surfaces.

Figure 4:
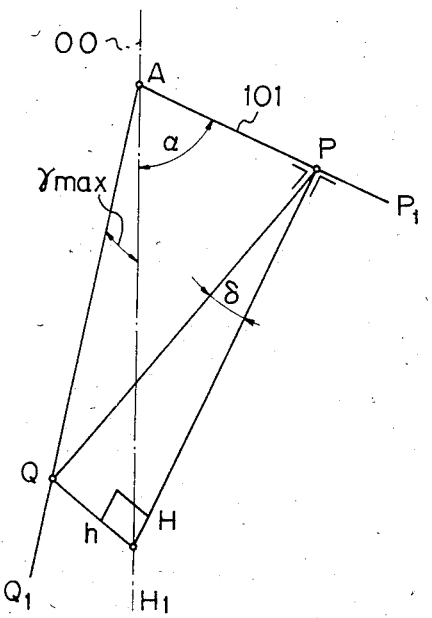
FIG. 4 is a diagram explaining a limitative relief angle of the cutting edge.

The interference is explained in more detail with reference to FIG. 4. The angle formed by the axis 00 and the line of intersection between the relief plane and any plane including the axis 00 is a maximum $\gamma_{max}$ when the plane including the axis 00 intersects the plane including the cutting edge line and the axis 00 at an angle of 90 degrees. Accordingly, the requirement for no interference is that $\gamma_{max} < \alpha$.

In the drawing, the drill axis 00 is indicated as line $AH_1$ and the cutting edge line 101 as line $AP_1$ passing through the center A of the drill. Line $AQ_1$ is indicated as an intersecting line in the rake surface, which line is included in a plane which is perpendicular to the plane including lines $AH_1$ and $AP_1$ and includes line $AH_1$. A perpendicular line QP is drawn from an arbitrary point Q in line $HQ_1$ to line $AP_1$, the perpendicular line QP intersecting line $AP_1$ at a cross point P. Another perpendicular line QH is drawn from above point Q to line $AH_1$, QH intersecting line $AH_1$ at a cross point H. By making use of three perpendicular theorum of solid geometry, line HP intersects line AP at a right angle and line HP intersects line HQ at a right angle, namely $HP \perp AP$ and $HP \perp HQ$. Now, if the acute angle $\angle HPQ$ at point P is $\delta$, the angle $\delta$ is a complementary angle of the relief angle $\tau$ as sought, where $\tau$ is a relief angle at point P in the cutting edge.

Furthermore, the interrelationship among values $\alpha$, $\gamma_{max}$, and $\delta$ is obtained as below: If the segment QH is h, one can obtain from $\angle HAP = \alpha$ and $\angle HAQ = \gamma_{max}$ that:

$$\tan \alpha = HP/AP = h \cot \delta / h \cot \gamma_{max} \cos \alpha$$

by simplifying the above, $$\tan \gamma_{mas} = \sin \alpha . \tan \delta$$ Hence, by using the previous requirement $\tan \gamma_{max} < \tan \alpha$, the relationship between $\alpha$ and $\delta$ is obtained as below:

$$\cos \alpha < \cot \delta \quad (10)$$

The following table gives examples of some calculations:

| τ | δ | α> |
|---|---|---|
| 5° | 85° | 84° 59' |
| 10° | 80° | 79° 51' |
| 12° | 78° | 77° 44' |
| 15° | 75° | 74° 27' |

Therefore, in practical use, it is preferable to select the apex angle of the drill end within the following range:

$$2\alpha \geq 180° - 2\tau \quad (11)$$

In formation of the noncutting edge sections, either or both of the relief surface and the rake surface may be partially removed. Alternatively, no edge material need be provided at that section at all. FIGS. 1a and 1b through 3a and 3b, for better understanding of the noncutting edge section, show both of the relief and rake surfaces removed. Provision of a suitable rake angle to the cutting edges, may result in better cutting action.

As stated before, the inner and outer cutting edge sections 101 and 102, respectively located at the inward and outward sides adjacent to the intermediate noncutting edge section may be fabricated as single solid blades as shown in FIGS. 1a, 1b and 2a, 2b or may be composed of separated tips as shown in FIGS. 3a and 3b. With respect to the means for fixing the cutting tips, several conventional systems, such as brazing and mechanical clamping, are available. An explanation thereof is omitted herein.

Figure 7A:
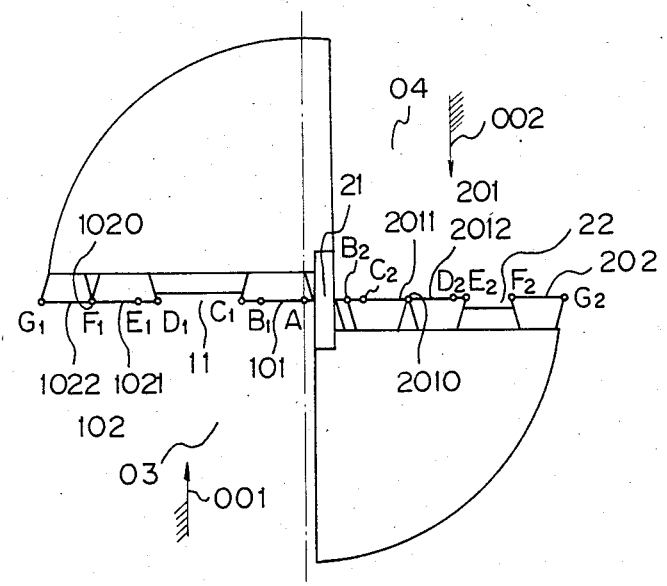
FIG. 7a is a plan view of an embodiment of the present invention in which standard inserted tipped-blades are arranged in in place of solid cutting edges.
Figure 7B:
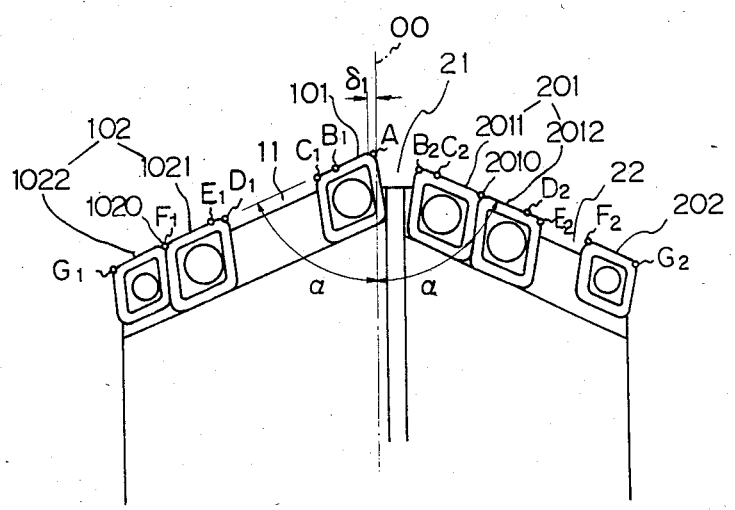

FIGS. 7a and 7b illustrate an example of a drill equipped with standard inserted tipped-blades of a diamond shape. It is important that the center of a rounding off circle at the innermost corner of a tipped-blade located in the inner cutting edge section have a predetermined slight outward offset. This offset is indicated as symbol $\delta_1$ in FIG. 7b.

The intermediate cutting edge section 201 in the right cutting edge line having the inner noncutting edge section 21 is composed of two inserted tipped blades 2011 and 2012 in close contact with each other in a side-to-side relation. A jointing portion 2010 between the adjacent tipped blades 2011 and 2012 provides a small notch or a so-called nick between parts of two rounded off circles of the adjacent tipped blades. The nick serves as a chip breaking means for dividing sheared chipping layers flowing away from the cutting edge. The outer cutting tipped blades 102 in the left cutting edge line having the inner cutting edge section 101 are similarly constituted, namely two outerside inserted tipped blades 1021 and 1022 are in close contact with each other. Therefore, another nick 1020 having the same function as above appears between the tipped blades.

The extreme outermost tipped blades 1022 and 202 arranged at diametrically opposite sides should have the same shape and dimension, the length dimension being arbitrary and including zero and, therefore, the outside diameter of the tool being freely selected. Accordingly, a design with no outermost tipped blades 1022 and 202 is possible. As to the configuration of the tipped blade, normally a perfect pentagon, square, regular triangle, or part or combination of the same can be adopted in relation to the apex angle of the tool.

As detailed hereinbefore, some relatively simple assumptions enable the design of rotary cutting tools with substantially iliminating bending moments. Some minor unbalanced bending moments may remain owing to error from these assumptions, but the machining accuracy of the tools is still remarkably improved. Also, even the actual dimensions of the tools slightly differ from the calculated values, effective reduction of the unbalanced bending moments can be expected. In short, the invention is directed to the formation of a tool in which the noncutting edge sections provided in the cutting edge lines are of approximate lengths and location as previously determined based on the assumption that the bending moments around two axes crossing at a right angle in a plane perpendicular to the axis of a tool are both zero and respectively.

Figure 5:
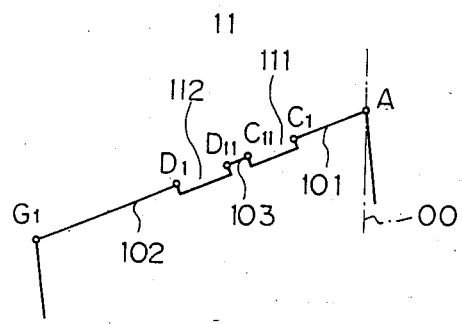
FIG. 5 is a schematic partial side sectional view of the cutting edge line with two intermediate noncutting edge sections.

In this regard, as shown in FIG. 5, the intermediate noncutting edge section in the cutting edge line having the inner cutting edge section may be given a small cutting edge section therein, resulting in a smaller width of chips flowing out therefrom. In this case, the most appropriate dimension of the cutting edge line with the divided noncutting edge section also can be previously determined through numerical calculation.

In every case as mentioned above, it is preferable to correct those values decided by calculus through subsequent experimental data. Incidentally, it is desirable that the length of the noncutting edge sections be set as small as possible in view of cutting efficiency.

As mentioned above, it is not absolutely necessary in practice that a strictly precise dimensional relationship be maintained in the cutting edge lines. However, to prevent the possible excessive unbalanced bending moment, it is indispensable that the sum of the length of the noncutting edge sections of the cutting edge line having the inner cutting edge section be larger than that of the opposite cutting edge line having the inner noncutting edge section.

Figure 6A:
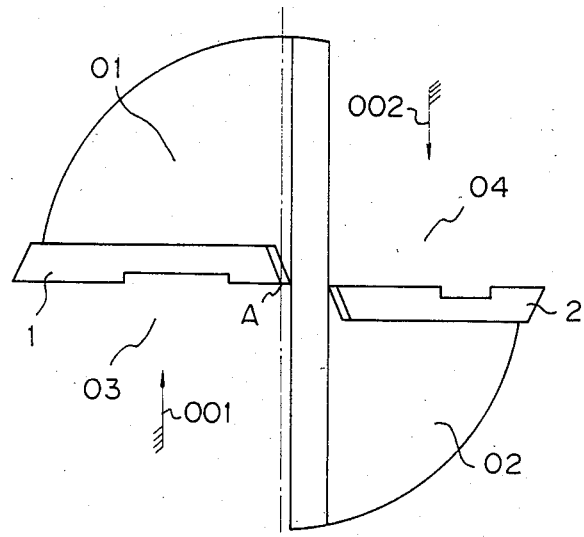
FIG. 6a is plan view of a special embodiment of the present invention in which the apex angle $2\alpha$ is greater than 180°.
Figure 6B:
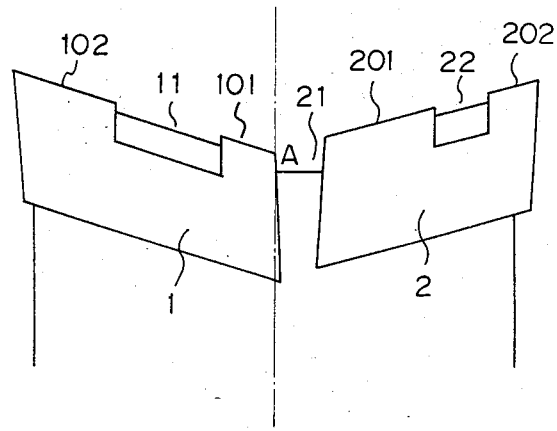

While the above description has been made in reference to drills with an apex angle smaller than 180°, the present invention may also be applied to an end milling cutter, wherein the outer cutting edge section extends much further outward in length. FIGS. 6a and 6b illustrate a drill having an apex angle larger than 180°. FIG. 6a is a schematic plan view as viewed at the drill end. FIG. 6b is a schematic side elevational view as viewed as viewed in a vertical plane including the tool axis and the cutting edge lines. This embodiment is useful for drilling thin plate materials or inclined surfaces.

Further, the right and left cutting edge lines need not always be true straight lines. They may also be convex curvilinear lines or other curvilinear lines. In such cases, however, complicated corrections of the locations of the cutting edge sections may be required.

Grooves or flutes, for ejecting chips from the cutting edges are formed in the body of the drill. These may be straight, helical, or combined straight and helical. Details thereof are also omitted. Briefly, however, the cross-sectional contour and dimensions of the grooves 03 and 04 need not be kept constant throughout the entire length thereof. To ensure the strength and rigidity of the tool, it is rather desirable to gradually decrease the depth of grooves toward the shank side, so long as chip removal is possible. It is also desirable to use helicoidal grooves as parts of the grooves to improve the chip flow.

Furthermore, in the embodiments shown in FIGS. 1a and 2a, when the upper cutting edge is worn out, it may be economical that the diagonal point A' and the opposite side A'C'$_1$ be adopted in place of the upper side edge A and AC$_1$.

I claim:

1. A rotary cutting tool having at an axial end surface thereof two cutting edge lines arranged substantially in a diametral plane extending through a center of rotation of the tool, one cutting edge line having an inner cutting edge section (101) adjacent to the center and the other having an inner noncutting edge section (21) adjacent to the center, in which the cutting edge line (20) having the inner noncutting edge section (21) has one intermediate noncutting edge section (22) and the cutting edge line having the inner cutting edge section (101) has at least one intermediate noncutting edge section (11), said at least one intermediate noncutting edge section (11) of the cutting edge line having the inner cutting edge section is located within a radius from the center larger than a radius from the center of the inner noncutting edge section of the other cutting edge line, said intermediate noncutting edge section (22) of the cutting edge line having the inner noncutting edge section being located within a radius from the center corresponding to a radius from the center of an outermost cutting edge section (102) of the cutting edge line having the inner cutting edge section, characterized in that basic dimensions and locations of cutting edge section and noncutting edge sections arranged along both cutting edge lines are determined so as to substantially satisfy the following two equations:

$$b + c - d - e + 1 = 0$$

$$b^2 + c^2 - d^2 - e^2 + 1 = 0$$

where:
$b = r_B/r_F$
$c = r_C/r_F$
$d = r_D/r_F$
$e = r_E/r_F$ $r_B$, $r_C$, $r_D$, $r_E$, $r_F$ and $r_G$ respectively indicating a radius from the center axis (0 0) at respective points, $B_2$, $C_1$, $D_1$, $E_2$, $F_2$ and $G_1$ in both the cutting edge lines, rendering the relative condition below, $$r_B \leq r_C < r_D \leq r_E < r_F \leq r_G$$

and determining the dimensions and locations of cutting edge sections and noncutting edge sections.

2. A rotary cutting tool according to claim 1, characterized in that, in the cutting edge line having the inner noncutting edge section, the length of the inner noncutting edge section equals that of the intermediate noncutting edge section of that cutting edge line and the total length of the noncutting edge sections equals that of the intermediate noncutting edge section of the cutting edge line having the inner cutting edge section and in that the length of cutting edge section ($B_2E_2$ 201) of the cutting edge line having the inner noncutting section equals twice that of the inner cutting edge section (AC, 101) of the cutting edge line having the inner cutting edge section.

* * * * *